(12) United States Patent
Takahashi et al.

(10) Patent No.: US 6,525,907 B1
(45) Date of Patent: Feb. 25, 2003

(54) MAGNETIC TAPE CARTRIDGE HAVING ABUTMENT REFERENCE SURFACES

(75) Inventors: Daisuke Takahashi, Kanagawa-ken (JP); Hideaki Shiga, Kanagawa-ken (JP); Kiyoo Morita, Kanagawa-ken (JP); Yusuke Ishihara, Kanagawa-ken (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 41 days.

(21) Appl. No.: 09/704,616

(22) Filed: Nov. 3, 2000

(30) Foreign Application Priority Data

Nov. 4, 1999 (JP) ............................................. 11-313547
Nov. 4, 1999 (JP) ............................................. 11-313548

(51) Int. Cl.$^7$ .............................................. G11B 23/02
(52) U.S. Cl. ....................................................... 360/132
(58) Field of Search ................................. 360/132, 133, 360/134, 60, 95, 96.5, 99.06; 242/195, 199, 197, 348, 348.2, 343.2, 338, 338.1, 348.3, 332.4; 206/508; 220/359; G11B 23/107, 23/87, 23/00

(56) References Cited

U.S. PATENT DOCUMENTS

| | | | | |
|---|---|---|---|---|
| 3,672,603 A | * | 6/1972 | Swain .......................... | 360/132 |
| 4,426,047 A | * | 1/1984 | Richard et al. .......... | 242/348.2 |
| 4,477,851 A |   | 10/1984 | Dalziel et al. | |
| 4,555,077 A | * | 11/1985 | Platter et al. ............. | 242/348.2 |
| 5,328,123 A | * | 7/1994 | LeNoue et al. .......... | 242/348.3 |
| 5,465,187 A |   | 11/1995 | Hoge et al. | |
| 5,610,789 A |   | 3/1997 | Miller | |
| D407,084 S | * | 3/1999 | Waaler et al. ............... | D14/121 |
| 6,345,779 B1 | * | 2/2002 | Rambosek ................... | 360/132 |

FOREIGN PATENT DOCUMENTS

| | | | | |
|---|---|---|---|---|
| EP | 0 926 675 A1 | | 6/1999 | |
| JP | 11-260027 | * | 9/1999 | ......... G11B/23/107 |
| JP | 11-353849 | * | 12/1999 | ......... G11B/23/107 |
| JP | 2002-25158 | * | 1/2002 | ......... G11B/15/675 |

* cited by examiner

Primary Examiner—William Korzuch
Assistant Examiner—Christopher R. Beacham
(74) Attorney, Agent, or Firm—Sughrue Mion, PLLC

(57) ABSTRACT

A magnetic tape cartridge includes a magnetic tape wound around a single reel and a cartridge casing in which the reel is housed for rotation. The cartridge casing is provided on its side surface with a locator portion having an abutment surface which is adapted to abut against a locator member of a recording and reproducing apparatus to locate the magnetic tape cartridge in place with respect to the recording and reproducing apparatus. The abutment surface of the locator portion is provided with a draft angle for facilitating ejection of the cartridge casing from a mold smaller than the draft angle for the other part of the side surface of the cartridge casing.

10 Claims, 3 Drawing Sheets

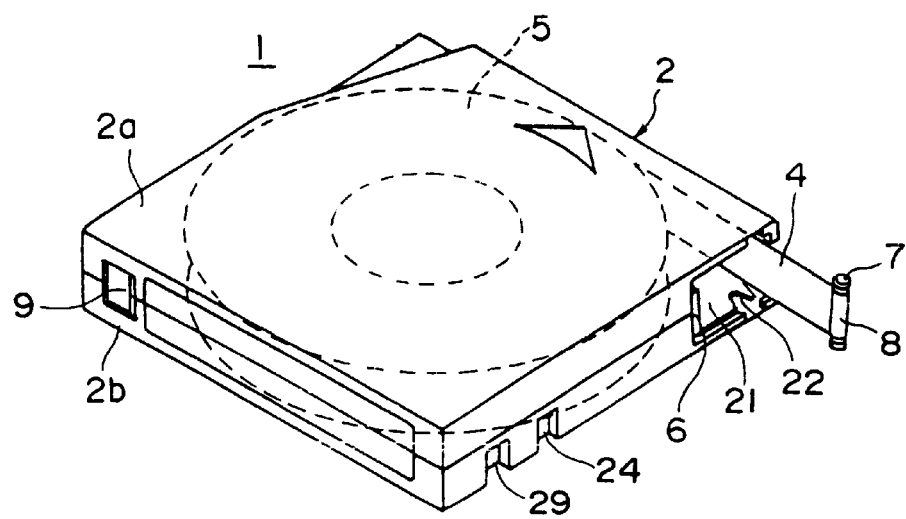
F I G . 1
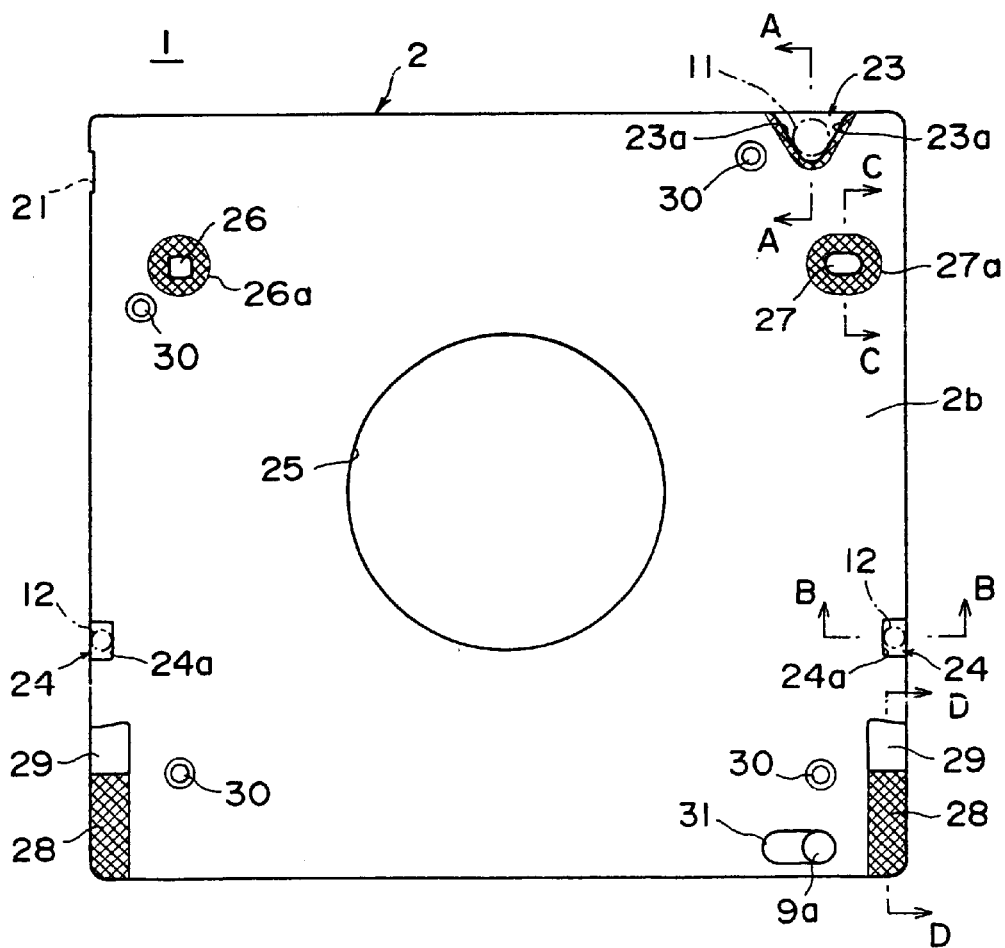
F I G . 2

MAGNETIC TAPE CARTRIDGE HAVING ABUTMENT REFERENCE SURFACES

BACKGROUND OF THE INVENTION

1. Field of the Invention

This invention relates to a magnetic tape cartridge comprising a cartridge casing and a single reel which is housed in the cartridge casing for rotation and around which a magnetic tape is wound, and more particularly to a structure for locating in place such a magnetic tape cartridge.

2. Description of the Related Art

As a recording medium for use in an external memory of a computer or the like, there has been known a magnetic tape cartridge comprising a magnetic tape wound around a single reel and a cartridge casing in which the reel is housed for rotation. Since the magnetic tape is used for storing data in a computer or the like and important information is stored on the magnetic tape, the magnetic tape cartridge is structured so that trouble such as tape jam does not occur and the magnetic tape is not accidentally drawn out.

Further, it is necessary to accurately locate in place the magnetic tape cartridge with respect to a recording and reproducing apparatus when it is loaded in the recording and reproducing apparatus. For example, a locator portion is formed on a side surface of the cartridge casing, and the magnetic tape cartridge is located in place with respect to the recording and reproducing apparatus by a locator member of the recording and reproducing apparatus being brought into abutment against the locator portion of the cartridge casing. Further, a reference surface is formed on the bottom surface of the cartridge casing and a locator member of a recording and reproducing apparatus is brought into abutment against the reference surface when the magnetic tape cartridge is loaded in the recording and reproducing apparatus, whereby the magnetic tape cartridge is held in a predetermined level with respect to the recording and reproducing apparatus so that the magnetic tape is fed from the magnetic tape cartridge to the recording and reproducing apparatus at a predetermined level.

The cartridge casing is generally formed of upper and lower casing halves fixed together. Since the upper and lower casing halves are formed by plastic molding, the side wall surface of the cartridge casing is provided with a draft angle for facilitating ejection of the product from the mold. Further, the surface of the cartridge casing is sometimes grained to make the surface matte so that an uneven pattern generated on the surface by molding becomes less remarkable. The lower casing half is substantially rectangular in shape and comprises a bottom wall and a side wall erected from the peripheral edge of the bottom wall. Inside the lower casing half, an arcuate inner rib is formed to extend along the reel, boss portions for screwing the upper and lower casing halves are formed, and a sliding portion on which a sliding door for closing and opening a tape draw-out opening slides, a write-protector receiving portion and the like are provided. Further, ribs and steps are formed on the bottom wall of the lower casing half.

In such a cartridge casing, there has been a problem that, since a draft angle is provided to the side wall surface in order to facilitate mold release of the product and the abutment surface of the locator portion is provided with the same draft angle, the position in which the locator member abuts against the locator portion varies according to the draft angle when the position of the magnetic tape cartridge relative to the recording and reproducing apparatus fluctuates in the vertical direction, whereby the position of the magnetic tape cartridge as located by the locating member fluctuates.

Further, when a sinkmark is generated on the reference surface on the bottom surface of the cartridge casing, there arises fear that flatness and surface accuracy of the reference surface deteriorate and accuracy in locating the magnetic tape cartridge with respect to the recording and reproducing apparatus deteriorates.

SUMMARY OF THE INVENTION

In view of the foregoing observations and description, the primary object of the present invention is to provide a magnetic tape cartridge which can improve accuracy in locating the magnetic tape cartridge by the locator portion on the side wall surface of the cartridge casing and by the reference surface on the bottom surface of the cartridge casing.

In accordance with a first aspect of the present invention, there is provided a magnetic tape cartridge comprising a magnetic tape wound around a single reel and a cartridge casing in which the reel is housed for rotation, the cartridge casing being provided on a side surface thereof with a locator portion having an abutment surface which is adapted to abut against a locator member of a recording and reproducing apparatus to locate the magnetic tape cartridge in place with respect to the recording and reproducing apparatus, wherein the improvement comprises that the abutment surface of the locator portion is provided with a draft angle for facilitating ejection of the cartridge casing from a mold smaller than the draft angle for the other part of the side surface of the cartridge casing.

It is preferred that the abutment surface of the locator portion be low in surface roughness from the viewpoint of facilitating mold release.

In accordance with a second aspect of the present invention, there is provided a magnetic tape cartridge comprising a magnetic tape wound around a single reel and a cartridge casing in which the reel is housed for rotation, the cartridge casing being provided on its bottom surface with a reference surface which is adapted to abut against a locator member of a recording and reproducing apparatus to locate the magnetic tape cartridge in place with respect to the recording and reproducing apparatus, wherein the improvement comprises that the bottom wall of the cartridge casing is uniform in thickness and free from a rib or a step at the part where the reference surface is provided.

When the bottom wall of the cartridge casing is small in thickness, sinkmarks are less apt to be generated.

In the magnetic tape cartridge in accordance with the first aspect of the present invention, since the draft angle of the abutment surface of the locator portion is smaller than the draft angle for the other part of the side surface of the cartridge casing, the position in which the locator member abuts against the abutment surface does not largely vary even if the position of the magnetic tape cartridge relative to the recording and reproducing apparatus fluctuates in the vertical direction, whereby the position of the magnetic tape cartridge as located by the locating member can be stabilized, and the position and attitude of the magnetic tape cartridge in the recording and reproducing apparatus can be held proper.

When the abutment surface of the locator portion is low in surface roughness (e.g., a gloss surface or a surface having fine roughness), the cartridge casing can be easily ejected from the mold even if the draft angle of the abutment surface is small and generation of defective moldings upon ejection of the products can be suppressed.

In the magnetic tape cartridge in accordance with the second aspect of the present invention, since the bottom wall of the cartridge casing is uniform in thickness and free from a rib or a step at the part where the reference surface is provided, the reference surface, against which the locator member of the recording and reproducing apparatus is brought into abutment to locate the magnetic tape cartridge in place with respect to the recording and reproducing apparatus, can be free from a sinkmark, whereby flatness and surface accuracy of the reference surface can be ensured and the position of the magnetic tape cartridge as located by the locating member can be stabilized to hold proper the position and attitude of the magnetic tape cartridge in the recording and reproducing apparatus.

BRIEF DESCRIPTION OF THE DRAWINGS

FIG. 1 is a perspective view of a magnetic tape cartridge in accordance with an embodiment of the present invention in a state where the magnetic tape is drawn out, FIG. 2 is a bottom view of the cartridge casing of the magnetic tape cartridge.

DESCRIPTION OF THE PREFERRED EMBODIMENT

Figure 3:
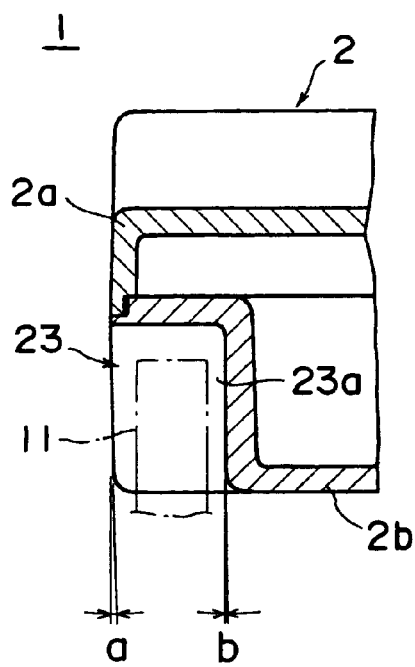
FIG. 3 is a cross-sectional view taken along line A—A in FIG. 2.

A magnetic tape cartridge 1 in accordance with an embodiment of the present invention will be described with reference to the drawings, hereinbelow. In the following description, terms regarding the position or the direction, such as "right", "left", "front" and "rear" will be expressed on the basis of the direction of insertion of the magnetic tape cartridge 1 into a recording and reproducing apparatus (obliquely rightward in FIG. 1).

The magnetic tape cartridge 1 comprises a substantially square flat cartridge casing 2 formed by fastening together upper and lower casing halves 2a and 2b by screws or the like. A single reel 5 around which a magnetic tape 4 is wound is housed for rotation in the cartridge casing 2. A leader pin 7 is fixed to the end of the magnetic tape 4. A tape draw-out opening 21 through which the magnetic tape 4 is drawn out is formed in the right side wall of the cartridge casing 2. The tape draw-out opening 21 is opened and closed by a sliding door 6 which is normally urged in its closing position by a resilient means (not shown). When the magnetic tape cartridge 1 is not being used, the magnetic tape 4 is fully taken up around the reel 4 with the leader pin 7 on the end thereof held in a recess 22 formed near the tape draw-out opening 21. The leader pin 7 is for tape loading for introducing the magnetic tape 4 into a tape running path in the recording and reproducing apparatus, and is fixed to the end of the magnetic tape 4 by means of a clip 8 which is C-shaped in cross-section.

In FIG. 2, showing the bottom surface of the cartridge casing 2, a first locator portion 23 (a V notch) in the form of a V-shaped notch is formed on the front end face of the lower casing half 2b, and second locator portions 24 (a side notch) in the form of a rectangular notch are formed on the left and right side walls of the cartridge casing 2 at their rear portions.

Figure 4:
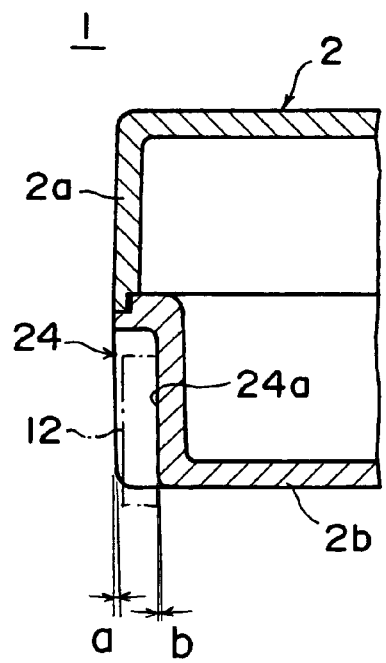
FIG. 4 is a cross-sectional view taken along line B—B in FIG. 2.

A locator member 11 of the recording and reproducing apparatus is brought into abutment against abutment surfaces 23a (forming a V-shape together) of the first locator portion 23 as also shown in FIG. 3 to locate the magnetic tape cartridge 1 in the direction of insertion thereof into the recording and reproducing apparatus and to locate the front end portion of the magnetic tape cartridge 1 left and right. A pair of locator members 12 of the recording and reproducing apparatus are brought into abutment against abutment surfaces 24a (bottom surfaces) of the second locator portion 24 as also shown in FIG. 4 to locate the rear end portion of the magnetic tape cartridge 1 left and right.

The abutment surfaces 23a and 24a of the first and second locator portions 23 and 24 are provided with a draft angle b which is smaller than the draft angle a (larger than 1°)for the other part of the side surface of the lower casing half 2b and, for instance, 0.5° to 1°. The inner surfaces of the first and second locator portions 23 and 24 including the abutment surfaces 23a and 24a are gloss surfaces low in surface roughness. The portion of the first locator portion 23 near the bottom thereof is rounded and the gloss surface extends to the region indicated by crosshatching in FIG. 2.

The abutment surfaces 23a and 24a of the first and second locator portions 23 and 24 may be provided with a pattern of unevenness which is fine in surface roughness (fine grain) instead of the gloss surface. In this case, the difference in height between the top and the bottom of the unevenness is set within the range corresponding to the difference in dimension between upper and lower parts of the abutment surfaces 23a and 24a which is generated due to the draft angle b.

Further, as shown in FIG. 2, a pair of reference holes 26 and 27, one being square in cross-section and the other being ellipsoidal in cross-section, are formed in the front portion of the bottom surface of the lower casing half 2b respectively near the left side wall and the right side wall of the lower casing half 2b. Portions around the reference holes 26 and 27 (the regions indicated by crosshatching in FIG. 2) are flat and form front reference surfaces 26a and 27a. Further, portions at left and right rear corners of the bottom surface of the lower casing half 2b (the regions indicated by crosshatching in FIG. 2) are flat and form rear reference surfaces 28. The front and rear reference surfaces 26a, 27a and 28 (the cross-hatched portions) are gloss surfaces free from unevenness and the other part of the bottom surface of the lower casing half 2b are finely grained.

Reference pins (not shown) of the recording and reproducing apparatus are inserted into the reference holes 26 and 27 from below and leveling portions of the respective reference pins are brought into abutment against the front reference surfaces 26a and 27a, whereby the magnetic tape cartridge 1 is located in the direction of insertion thereof into the recording and reproducing apparatus and left and right, and at the same time, the level of the front end portion of the magnetic tape cartridge 1 is adjusted. Further, leveling portions of reference members (not shown) of the recording and reproducing apparatus are brought into abutment against the rear reference surfaces 28 to adjust the level of the rear end portion of the magnetic tape cartridge 1.

Figure 5:
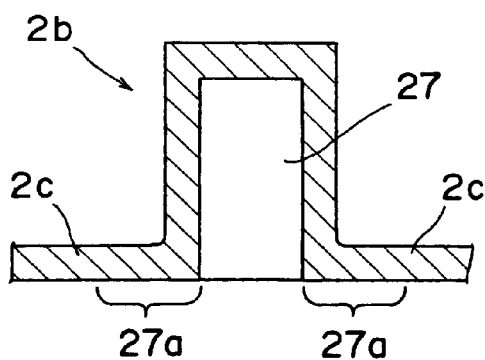
FIG. 5 is a cross-sectional view taken along line C—C in FIG. 2.
Figure 6:
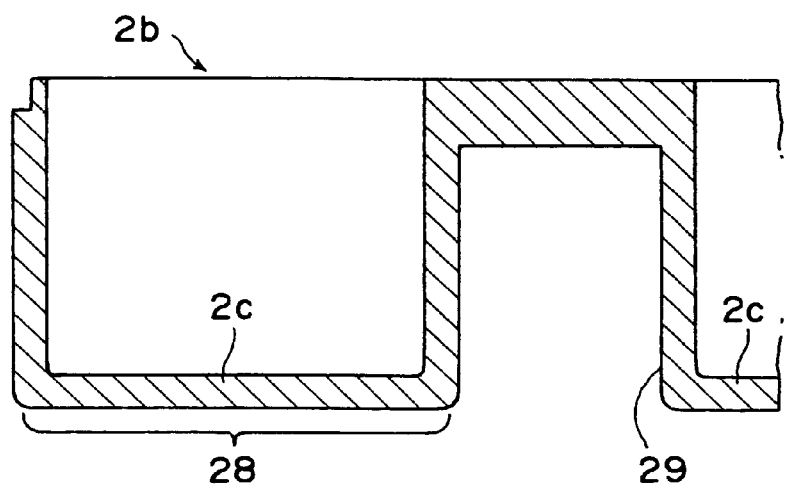
FIG. 6 is a cross-sectional view taken along line D—D in FIG. 2.

Further, as shown in FIGS. 5 and 6, the portion 2c of the bottom wall of the lower casing half 2b where the front and rear reference surfaces 26a, 27a and 28 are formed is free from a rib or a step on the inner side thereof and is of a uniform thickness. No sinkmark is generated in the portion 2c of the bottom wall where the wall thickness is uniform, and accordingly the reference surfaces 26a, 27a and 28 can be flat. When the portion 2c is small in wall thickness, sinkmarks are less apt to be generated. Though the inlet portion of the reference hole 27 (or the reference hole 26) is not chamfered in FIG. 5, the inlet portion may be tapered or rounded depending on the shape of the tip of the reference pins.

Further, as shown in FIG. 2, an opening 25 through which a drive gear for rotating the reel 5 is inserted is formed in the bottom wall of the lower casing half 2b at the center thereof. Handling notches 29 in the form of recesses are formed respectively on the left and right side walls of the lower casing half 2b between the second locator portions 24 and the rear reference surfaces 28. A magnetic tape cartridge transfer means, which transfers the magnetic tape cartridge 1, for instance, in a storage apparatus such as a library, grips the magnetic tape cartridge 1 at the handling notches 29. Screw holes 30 through screws for fastening the upper and lower casing halves 2a and 2b are inserted are provided in the bottom wall of the lower casing half 2b at four places, and an elongated hole 31 in which a projection 9a of a write-protector 9 slides is formed in the bottom wall of the lower casing half 2b at the rear end portion thereof.

Though not shown, the reel 5 is provided at the center thereof with a brake mechanism for preventing the reel 5 from being rotated when the magnetic tape cartridge 1 is not being used. Further, the reel 5 is provided at the bottom surface thereof with a reel plate which is magnetically held by the drive gear and at the peripheral surface thereof with a reel gear to be brought into engagement with the drive gear. When the reel gear is engaged with the drive gear, the brake mechanism is released to permit rotation of the reel 5.

The first and second locator portions 23 and 24 are for preliminarily locating the magnetic tape cartridge 1 with respect to a bucket (not shown) of the recording and reproducing apparatus and the magnetic tape cartridge 1 is finally located in place for recording and reproduction when the bucket is lowered to a position opposed to a magnetic head. The location for recording and reproduction is effected by the reference holes 26 and 27 (the front reference surfaces 26a and 27a) and the rear reference surfaces 28 on the bottom surface of the lower casing half 2b.

In the magnetic tape cartridge 1 of this embodiment, since the draft angle b for the abutment surfaces 23a and 24a of the first and second locator portions 23 and 24 is smaller than the draft angle a for the other part of the side surface of the cartridge casing, the position in which the locator members abut against the abutment surfaces does not largely vary even if the position of the magnetic tape cartridge 1 relative to the recording and reproducing apparatus fluctuates in the vertical direction, whereby the position of the magnetic tape cartridge 1 as located by the locating members can be stabilized.

Further, since the portion 2c of the bottom wall of the lower casing half 2b where the front and rear reference surfaces 26a, 27a and 28 are formed is free from a rib or a step on the inner side thereof and is of a uniform thickness, no sinkmark is generated in the portion 2c of the bottom wall and accordingly the reference surfaces 26a, 27a and 28 can be flat, whereby the magnetic tape cartridge can be properly leveled and the locating accuracy is stabilized.

Figure 7:
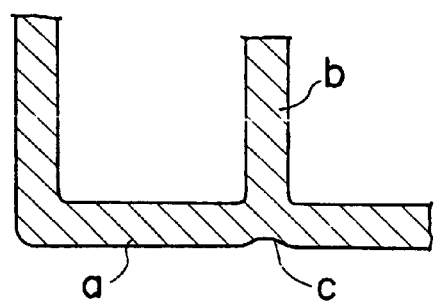
FIG. 7 is fragmentary cross-sectional view showing a state where a sinkmark is generated.

That is, for example, when a rib b (or a step) is formed on the bottom wall a of the lower casing and there exists a difference in wall thickness as shown in FIG. 7, a sinkmark c is generated on the surface of the bottom wall a at a portion opposed to the rib b due to difference in shrinkage when the resin is solidified. When such a sinkmark (recess) c is generated in the reference surface and the locator member of the recording and reproducing apparatus is brought into abutment against the reference surface at the sinkmark c, the magnetic tape cartridge cannot be correctly leveled with respect to the recording and reproducing apparatus, which adversely affects recording and reproduction.

The number and the positions of the first and second locator portions 23 and 24, the reference holes 26 and 27 (the front reference surfaces 26a and 27a) and the rear reference surfaces 28 may be changed as desired without limited to those in the illustrated embodiment.

In addition, all of the contents of Japanese Patent Application Nos. 11(1999)-313547, 11(1999)-313548 and 2000-322842 are incorporated into this specification by reference.

What is claimed is:

1. A magnetic tape cartridge comprising a magnetic tape wound around a single reel and a cartridge casing in which the reel is housed for rotation, the cartridge casing being provided on a side surface thereof with a locator portion having an abutment surface which is adapted to abut against a locator member of a recording and reproducing apparatus to locate the magnetic tape cartridge in place with respect to the recording and reproducing apparatus, wherein the improvement comprises that the abutment surface of the locator portion is provided with a draft angle smaller than the draft angle for the other part of the side surface of the cartridge casing.

2. A magnetic tape cartridge as defined in claim 1 in which the abutment surface of the locator portion is low in surface roughness.

3. The magnetic tape cartridge according to claim 1, wherein said cartridge casing has a bottom wall on which is provided a reference surface configured to abut against a second locator member of a recording and reproducing apparatus to locate said magnetic tape cartridge in place with respect to the recording and reproducing apparatus, and wherein said bottom wall of said cartridge casing is uniform in thickness and free from a rib or a step where said reference surface is provided.

4. The magnetic tape cartridge according to claim 3, wherein said bottom wall of said cartridge casing is small in thickness.

5. The magnetic tape cartridge according to claim 4, wherein said bottom wall of said cartridge casing is small in thickness so as to prevent the formation of a sinkmark.

6. A recording and reproducing apparatus, comprising:
a locator member; and
a magnetic tape cartridge, said magnetic tape cartridge comprising a magnetic tape wound around a single reel and a cartridge casing in which said reel is housed for rotation, said cartridge casing including a side surface with a locator portion having an abutment surface that abuts against said locator member to locate said magnetic tape cartridge in place with respect to said recording and reproducing apparatus; and wherein said abutment surface of said locator portion has a draft angle that is smaller than a draft angle for another part of said side surface of said cartridge casing adjacent said abutment surface.

7. The magnetic tape cartridge according to claim 6, wherein said abutment surface of said locator portion is low in surface roughness.

8. A magnetic tape cartridge comprising a magnetic tape wound around a single reel and a cartridge casing in which the reel is housed for rotation, the cartridge casing comprising an upper casing half and a lower casing half, the lower casing half including a bottom wall with a bottom surface that is provided with a reference surface which is adapted to abut against a locator member of a recording and reproducing apparatus to locate the magnetic tape cartridge in place with respect to the recording and reproducing apparatus; wherein the improvement comprises that the bottom wall of the cartridge casing is uniform in thickness and free from a rib or a step at the part where the reference surface is provided, and wherein the bottom wall of the cartridge casing is small in thickness so as to prevent the formation of a sinkmark.

9. A magnetic tape cartridge comprising a magnetic tape wound around a single reel having a rotational axis, and a cartridge casing in which said reel is housed for rotation; wherein said cartridge casing has a bottom wall that lies in a plane substantially perpendicular to the rotational axis and on which is provided a reference surface configured to abut against a locator member of a recording and reproducing apparatus to locate said magnetic tape cartridge in place with respect to the recording and reproducing apparatus, and wherein said bottom wall of said cartridge casing is uniform in thickness and free from a rib or a step where said reference surface is provided; and wherein said bottom wall of said cartridge casing is small in thickness so as to prevent the formation of a sinkmark.

10. A recording and reproducing apparatus, comprising:

a locator member; and a magnetic tape cartridge, said magnetic tape cartridge comprising a magnetic tape wound around a single reel having a rotational axis, and a cartridge casing in which said reel is housed for rotation; wherein said cartridge casing has a bottom wall that lies in a plane substantially perpendicular to the rotational axis and on which is provided a reference surface configured to abut against said locator member of said recording and reproducing apparatus to locate said magnetic tape cartridge in place with respect to said recording and reproducing apparatus, and wherein said bottom wall of said cartridge casing is uniform in thickness and free from a rib or a step where said reference surface is provided; and wherein said bottom wall of said cartridge casing is small in thickness so as to prevent the formation of a sinkmark.

* * * * *